United States Patent
Zhang et al.

(10) Patent No.: US 12,236,081 B2
(45) Date of Patent: Feb. 25, 2025

(54) VERIFICATION METHOD, ELECTRONIC DEVICE, AND NON-TRANSITORY COMPUTER-READABLE STORAGE MEDIUM

(71) Applicant: VIVO MOBILE COMMUNICATION CO., LTD., Dongguan (CN)

(72) Inventors: Hancheng Zhang, Dongguan (CN); Yongfa Zhang, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 291 days.

(21) Appl. No.: 17/929,567

(22) Filed: Sep. 2, 2022

(65) Prior Publication Data

US 2022/0414192 A1 Dec. 29, 2022

Related U.S. Application Data

(63) Continuation of application No. PCT/CN2021/082951, filed on Mar. 25, 2021.

(30) Foreign Application Priority Data

Mar. 26, 2020 (CN) .......................... 202010224204.9

(51) Int. Cl.
  *G06F 3/0488* (2022.01)
  *G06F 21/31* (2013.01)
(52) U.S. Cl.
  CPC ............ *G06F 3/0488* (2013.01); *G06F 21/31* (2013.01)
(58) Field of Classification Search
  CPC ........ G06F 3/0488–04886; G06F 2203/04808; G06F 2203/014; G06F 3/016; G06F 2221/2133; G06F 21/36; G06F 3/04847; G06F 21/31–32; H04L 63/08; H04L 2463/082; H04W 12/06; H04W 12/77
  See application file for complete search history.

(56) References Cited

U.S. PATENT DOCUMENTS

| | | | |
|---|---|---|---|
| 9,176,587 | B2 | 11/2015 | Suzuki et al. |
| 2005/0225540 | A1 | 10/2005 | Kawakami et al. |
| 2015/0319153 | A1 | 11/2015 | Tartz et al. |
| 2017/0090569 | A1 | 3/2017 | Levesque |

(Continued)

FOREIGN PATENT DOCUMENTS

| | | |
|---|---|---|
| CN | 103797444 A | 5/2014 |
| CN | 103809693 A | 5/2014 |
| CN | 106155275 A | 11/2016 |

(Continued)

*Primary Examiner* — Temesghen Ghebretinsae
*Assistant Examiner* — Ivelisse Martinez Quiles
(74) *Attorney, Agent, or Firm* — The Webb Law Firm

(57) ABSTRACT

A verification method, includes: in a case that the first operation does not meet a verification condition, adjusting a current value of a first sub-region in the verification region, or increasing an area of the first sub-region in the verification region, or adjusting a current value of a second sub-region in the verification region. The verification region includes the first sub-region and the second sub-region, and after the current value of the first sub-region or the current value of the second sub-region is adjusted, the current value of the first sub-region is greater than the current value of the second sub-region.

16 Claims, 7 Drawing Sheets

(56) References Cited

U.S. PATENT DOCUMENTS

2017/0115734 A1    4/2017  Shimotani et al.
2018/0157893 A1*   6/2018  Lee .................... G06V 40/1365

FOREIGN PATENT DOCUMENTS

| CN | 107748638 A    | 3/2018  |
|----|----------------|---------|
| CN | 108363541 A    | 8/2018  |
| CN | 108604158 A    | 9/2018  |
| CN | 109948578 A    | 6/2019  |
| CN | 111444494 A    | 7/2020  |
| JP | 2012243189 A   | 12/2012 |
| JP | 2015109097 A   | 6/2015  |
| JP | 2019082901 A   | 5/2019  |
| KR | 1020170037486 A| 4/2017  |
| WO | 2014089969 A1  | 6/2014  |
| WO | 2016038677 A1  | 3/2016  |
| WO | 2018098953 A1  | 6/2018  |

* cited by examiner

VERIFICATION METHOD, ELECTRONIC DEVICE, AND NON-TRANSITORY COMPUTER-READABLE STORAGE MEDIUM

CROSS-REFERENCE TO RELATED APPLICATIONS

This application is a Bypass Continuation Application of PCT/CN2021/082951 filed on Mar. 25, 2021, which claims priority to Chinese Patent Application No. 202010224204.9 filed on Mar. 26, 2020, the disclosures of which are hereby incorporated by reference in their entirety.

BACKGROUND OF THE INVENTION

Field of the Invention

The present disclosure relates to the field of communications technologies, and in particular, to a verification method, an electronic device, and a non-transitory computer-readable storage medium.

Description of Related Art

In the related art, to distinguish between human operations and machine operations, it is necessary to carry out identity verification on an electronic device. During the identity verification, a verification code or pattern is often displayed on a display screen of the electronic device, and a received input operation is matched with a preset verification code. In a case that the matching succeeds, it is determined that the operation is performed by a real person, so that the identity verification succeeds.

SUMMARY OF THE INVENTION

The embodiments of the present disclosure provide a verification method, an electronic device, and a non-transitory computer-readable storage medium.

According to a first aspect, an embodiment of the present disclosure provides a verification method, performed by an electronic device. The electronic device includes a tactile screen. The method includes:

receiving a first operation performed on a verification region; and in a case that the first operation does not meet a verification condition, adjusting a current value of a first sub-region in the verification region, or increasing an area of the first sub-region in the verification region, or adjusting a current value of a second sub-region in the verification region, where the verification region includes the first sub-region and the second sub-region, and after the current value of the first sub-region or the current value of the second sub-region is adjusted, the current value of the first sub-region is greater than the current value of the second sub-region.

According to a second aspect, an embodiment of the present disclosure further provides an electronic device. The electronic device includes a tactile screen. The electronic device further includes:

a first receiving module, configured to receive a first operation performed on a verification region; and a first adjustment module, configured to, in a case that the first operation does not meet a verification condition, adjust a current value of a first sub-region in the verification region, or increase an area of the first sub-region in the verification region, or adjust a current value of a second sub-region in the verification region, where the verification region includes the first sub-region and the second sub-region, and after the current value of the first sub-region or the current value of the second sub-region is adjusted, the current value of the first sub-region is greater than the current value of the second sub-region.

According to a third aspect, an embodiment of the present disclosure further provides an electronic device, including a memory, a processor, and a computer program stored in the memory and runnable on the processor, where the processor, when executing the computer program, implements the steps of the verification method according to the first aspect of the embodiments of the present disclosure.

According to a fourth aspect, an embodiment of the present disclosure further provides a non-transitory computer-readable storage medium, storing a computer program, where the computer program, when executed by a processor, implements the steps of the verification method according to the first aspect of the embodiments of the present disclosure.

According to a fifth aspect, an embodiment of the present disclosure further provides a computer software product, stored in a non-transitory storage medium, where the software product is configured to be executed by at least one processor to implement the steps of the verification method according to the first aspect of the embodiments of the present disclosure.

According to a sixth aspect, an embodiment of the present disclosure further provides an electronic device, configured to perform the verification method according to the first aspect of the embodiments of the present disclosure.

BRIEF DESCRIPTION OF THE DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings.

DESCRIPTION OF THE INVENTION

The following clearly describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure shall fall within the protection scope of the present disclosure.

Identity verification is usually generated for registration, ordering, and logging in to a specific service. In the related art, the manner of displaying a verification code or pattern on a display screen can easily lead to the leakage of the verification code, resulting in some uncertain charges, self-identity information leakage, or the like. As can be seen, the identity verification method in the related art has the defect of reducing the security performance of the verification process.

A verification method provided in the embodiments of the present disclosure is performed by an electronic device with a tactile screen, to provide a user with different tactile sensations, so that the user can complete verification according to the tactile sensations, to ensure that the operator who passes the verification is a real person. In some implementations, the electronic device may be a mobile phone, a tablet personal computer, a laptop computer, a personal digital assistant (PDA), a mobile Internet device (MID), a wearable device, a computer, a notebook computer, or another electronic device with a tactile screen.

In some implementations, in the foregoing tactile screen technology, a magnitude of a current on the tactile screen may be adjusted, to change electrostatic attraction on the tactile screen, thereby providing the user with different tactile sensations when the user touches the tactile screen. Optionally, the magnitude of the current on the tactile screen may be adjusted, so that the tactile screen can simulate tactile sensations of different materials.

Figure 1:
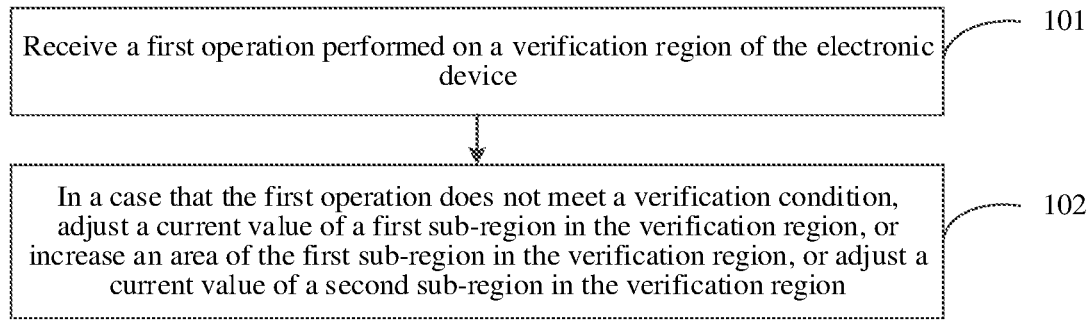
FIG. 1 is a flowchart of a first verification method according to an embodiment of the present disclosure.

FIG. 1 is a flowchart of a first verification method according to an embodiment of the present disclosure. The method is performed by an electronic device. The electronic device includes a tactile screen. As shown in FIG. 1, the method may include the following steps.

Step 101: receive a first operation performed on a verification region.

In some implementations, the foregoing first operation may be an operation for verification in a process of login, payment verification, registration, or the like, for example, clicking a "Login" button on the tactile screen when logging in to an application program.

Step 102: in a case that the first operation does not meet a verification condition, adjust a current value of a first sub-region in the verification region, or increase an area of the first sub-region in the verification region, or adjust a current value of a second sub-region in the verification region, where the verification region includes the first sub-region and the second sub-region, and after the current value of the first sub-region or the current value of the second sub-region is adjusted, the current value of the first sub-region is greater than the current value of the second sub-region.

In some implementations, a current value at any position in the verification region can be adjusted, so that an electrostatic attraction value at any position in the verification region can be changed. During applications, when the user touches sub-regions with different electrostatic attraction values in the verification region, tactile sensations felt by the user are not the same.

Figure 2:
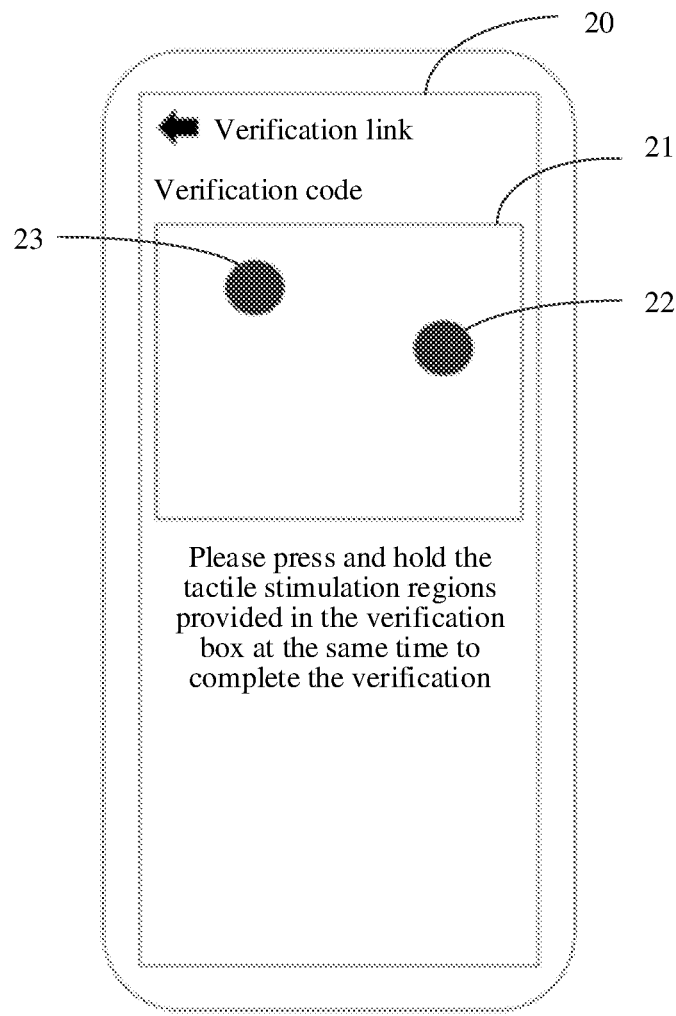
FIG. 2 is a diagram of an application scenario of a first verification method according to an embodiment of the present disclosure.

In practical applications, the foregoing verification region may be the region where the entire tactile screen is located, or may be a partial region on the tactile screen. For example, as shown in FIG. 2, the foregoing verification region may be a region within a verification box 21 displayed on a tactile screen 20.

In a case that a quantity of touch points of the first operation is the same as a quantity of the first sub-regions, the touch points of the first operation are in one-to-one correspondence with the first sub-regions, and the touch points at least partially overlap the first sub-regions, it is determined that the first operation meets the verification condition; otherwise, it is determined that the first operation does not meet the verification condition.

In the implementation of increasing the area of the first sub-region in the verification region in a case that the first operation does not meet the verification condition, an electrostatic attraction value of the first sub-region is different from an electrostatic attraction value of the second sub-region. In this way, the area of the first sub-region is increased, to enhance a tactile sensation generated when the user touches the first sub-region, thereby improving the recognition degree of the first sub-region.

Optionally, the current value of the second sub-region (or referred to as an electrostatic attraction value) may be 0, and the current value of the first sub-region may be greater than 0. In this way, when touching the first sub-region and the second sub-region, the user feels different tactile sensations, so that the first sub-region and the second sub-region can be distinguished according to the different tactile sensations. In addition, the foregoing first sub-region may also be referred to as a tactile region, a tactile stimulation region, or a region with different tactile sensations, which is not specifically limited herein.

In addition, there may be a plurality of first sub-regions, for example, two or three first sub-regions. In this way, the plurality of first sub-regions are distributed in the verification region at intervals. In another example, as shown in FIG. 2, a verification box 1 includes two first sub-regions, which are respectively a first tactile region 22 and a second tactile region 23. It should be noted that, in some implementations, during the verification, the first sub-regions are not displayed, and the first tactile region 22 and the second tactile region 23 shown in FIG. 2 are only used to illustrate the positions and distribution of the first sub-regions.

In practical applications, the quantity and the positions of the first sub-regions may be changed. For example, first sub-regions are randomly generated in the verification region, where the random generation of the first sub-regions may be a random quantity (the quantity is greater than 0 and less than 6) of generated first sub-regions, and random positions of the first sub-regions within the verification region. In this way, during the verification, a quantity and positions of first sub-regions in the current verification process cannot be predicted based on a quantity and positions of first sub-regions in a previous verification process, thereby improving the security performance of the verification process.

In addition, in the foregoing implementation of adjusting the current value of the first sub-region in the verification region or adjusting the current value of the second sub-region in the verification region, the current value of the first sub-region is larger than the current value of the second sub-region. Therefore, when touching the first sub-region, the user can feel a more stimulating or prominent tactile sensation, so that the touch position is determined as the first sub-region.

In addition, the adjustment of the current value of the first sub-region in the verification region or the adjustment of the current value of the second sub-region in the verification region may be alternatively understood as increasing the current value of the first sub-region or decreasing the current value of the second sub-region, to increase the difference between the current value of the first sub-region and the current value of the second sub-region. For example, the initial current value of the first sub-region is 10 mA, and the initial current value of the second sub-region is 2 mA. In this case, the current value of the first sub-region may be adjusted to 15 mA, or the initial current value of the second sub-region may be adjusted to 0 mA.

In an optional implementation, in response to the first operation in a case that the first operation does not meet a verification condition, after the adjusting a current value of a first sub-region in the verification region, or the increasing an area of the first sub-region in the verification region, or the adjusting a current value of a second sub-region in the verification region, the method further includes:

in a case that a touch input for the second sub-region is received and a touch time of the touch input is longer than a preset time, adjusting the current value of the first sub-region, or increasing the area of the first sub-region, or adjusting the current value of the second sub-region, where after the current value of the first sub-region or the current value of the second sub-region is adjusted, a difference between the current value of the first sub-region and the current value of the second sub-region increases.

In some implementations, the foregoing preset time may be any length of time such as 1 second or 2 seconds, and may be adjusted according to user settings. In addition, in a case that the touch input for the second sub-region is received and the touch time of the touch input is longer than the preset time, it may be determined that the user cannot accurately sense the position of the first sub-region. When the area of the first sub-region is increased or the difference between the current value of the first sub-region and the current value of the second sub-region is increased for the user to touch the verification region, the user can more strongly sense the difference in tactile sensations between the first sub-region and the second sub-region, so that the finger can be pressed in the first sub-region more accurately. For example, the electrostatic attraction value of the second sub-region is 0, and the tactile sensation is smooth. When the electrostatic attraction value of the first sub-region is small, the first sub-region can simulate a tactile sensation of cotton cloth. After the electrostatic attraction value of the first sub-region is increased, the first sub-region can simulate a tactile sensation of sandpaper, so that the difference in the tactile sensations between the first sub-region and the second sub-region is increased.

In this implementation, in a case that a touch input for the second sub-region is received and a touch time of the touch input is longer than a preset time, the current value of the first sub-region is adjusted, or the area of the first sub-region is increased, or the current value of the second sub-region is adjusted, which can improve the tactile intensity or the tactile area of the first sub-region, so that the user can more clearly sense the position and the shape of the first sub-region.

In an optional implementation, before the adjusting a current value of a first sub-region in the verification region, the method further includes:

determining an output manner of a current of the first sub-region according to shape information of the first sub-region or position information of the first sub-region.

In some implementations, the shape information of the first sub-region or the position information of the first sub-region may be shape information or position information corresponding to screen pixels where the first sub-region is located.

Optionally, the foregoing shape information may include information such as a shape, a contour, and a size of the first sub-region. In addition, the foregoing position information may include position information corresponding to the screen pixels where the first sub-region is located. In an implementation, in a case that the first sub-region includes two first sub-regions with different contours, or the size of the first sub-region is relatively large, the output manner of the current of the first sub-region may be determined as a first manner, where the first manner is to output the current in a contour region of the first sub-region. Alternatively, in a case that the size of the first sub-region is small, the output manner of the current of the first sub-region may be determined as a second manner, where the second manner is to output the current in the first sub-region.

In addition, in practical applications, the output manner of the current of the first sub-region may be alternatively determined according to the shape information of the first sub-region and the position information of the first sub-region, which is not specifically limited herein.

In some implementations, the output manner of the current of the first sub-region may include at least one of the first manner or the second manner, the first manner is to output the current in the contour region of the first sub-region, and the second manner is to output the current in the first sub-region.

In some implementations, before the adjusting a current value of a first sub-region in the verification region, or increasing an area of the first sub-region in the verification region, or adjusting a current value of a second sub-region in the verification region, the current values in the verification region may be the same, and the current value is often 0 or an electrostatic attraction value generated by the current value is often 0. In addition, the foregoing contour region may be a region close to an extension in the first sub-region. For example, the contour region may be a region where a contour line of the first sub-region is located, and the width of the contour line is 10 pixels.

In a case that the output manner is the first manner, the user can sense the contour of the first sub-region through touching. For example, in a case that the first sub-region is a triangle, the contour region is three sides of the triangle. In this implementation, an electric value is outputted only in the contour region, so that the power consumption can be reduced.

In addition, in a case that the output manner is the second manner, the user can sense a surface on which the first sub-region is located through touching. In this implementation, the current is outputted in the entire first sub-region, which can improve the sensing accuracy of the user, thereby improving the accuracy of the verification method.

Optionally, after the in a case that the first operation does not meet a verification condition, adjusting a current value of a first sub-region in the verification region, or increasing an area of the first sub-region in the verification region, or adjusting a current value of a second sub-region in the verification region, the method further includes:

adjusting, in a case that the output manner is the first manner, a touch input for the second sub-region is received, and a touch time of the touch input is longer than a preset time, the current value of the first sub-region to a first preset current value, where the first preset current value is greater than the current value of the second sub-region;

or increasing, in a case that the output manner is the second manner, a touch input for the second sub-region is received, and a touch time of the touch input is longer than a preset time, the current value of the first sub-region.

In some implementations, the first preset current value may be equal to a current value of the contour region, and certainly, may be alternatively any current value greater than the current value of the second sub-region.

In addition, after the current of the first sub-region is outputted in the first manner, only the contour region has the current, so that the user can only sense the contour of the first sub-region. In this implementation, in a case that a touch point is detected in the second sub-region and a touch time of the touch input is longer than a preset time, it may be considered that the user cannot accurately sense the position of the first sub-region. In this case, the current is outputted in the first sub-region, so that the user can sense the position of the entire first sub-region, thereby improving the accuracy of sensing the position of the first sub-region by the user, and further improving the operational convenience of the verification method.

Certainly, after the current is outputted in the first sub-region, if a touch point is still detected in the second sub-region and a touch time of the touch input is longer than the preset time, the current value of the first sub-region may be further increased.

In addition, after the current of the first sub-region is outputted in the second manner, if a touch point is detected in the second sub-region and a touch time of the touch input is longer than the preset time, the current value of the first sub-region is increased, to improve the tactile sensation of the user, thereby also improving the accuracy of sensing the position of the first sub-region by the user, and further improving the operational convenience of the verification method.

It should be noted that, the value of the first preset current value may be determined according to user settings or production settings, which is not limited herein.

During applications, after the verification region is generated, the user may touch the entire verification region with the hand to respectively sense a position of each first sub-region, and then press fingers on each of the first sub-regions simultaneously.

In this way, each first sub-region corresponds to a touch point, and there is no touch point in the second sub-region, so that the verification succeeds.

In an optional implementation, in a case that there are at least two first sub-regions, and before the in a case that the first operation does not meet a verification condition, adjusting a current value of a first sub-region in the verification region, or increasing an area of the first sub-region in the verification region, or adjusting a current value of a second sub-region in the verification region, the method further includes:

outputting sequence prompt information of the at least two first sub-regions, where the sequence prompt information includes sequencing information of the at least two first sub-regions; and after the in a case that the first operation does not meet a verification condition, adjusting a current value of a first sub-region in the verification region, or increasing an area of the first sub-region in the verification region, or adjusting a current value of a second sub-region in the verification region, the method further includes:

passing the verification in a case that touch inputs matching a sequence indicated by the sequencing information is received in the at least two first sub-regions and no touch input is received in the second sub-region.

In some implementations, the sequence prompt information may be outputted in any manner such as voice, text, picture, or animation. For example, text information of "sequentially touch each tactile region from left to right" is displayed on the tactile screen.

In an implementation, shapes of the at least two first sub-regions may be different, so that the user may be prompted, through the sequence prompt information, to sequentially touch the first sub-regions of the corresponding shapes. For example, if the verification region includes two first sub-regions, which are a triangular tactile region and a circular tactile region, sequence prompt information of "sequentially touch the triangular tactile region and the circular tactile region" is displayed on the tactile screen. In this way, the user first touches each tactile region in the verification region to sense a shape and a position of each tactile region, and then sequentially touches the triangular tactile region and the circular tactile region according to a sequence indicated by the sequence prompt information, to complete the verification.

In this implementation, there are at least two provided first sub-regions, and the user is informed of the sequence of the first sub-regions through the sequence prompt information, so that the user can sequentially touch the first sub-regions according to the sequence until each first sub-region is touched according to the arrangement sequence, and then the verification succeeds. In this way, the user only needs to touch one first sub-region at a time, thereby reducing the operation complexity of the verification method.

In an optional implementation, a verification button is further displayed on the tactile screen, and after the receiving a first operation performed on a verification region, the method includes:

obtaining position information of a touch point of the first operation, and obtaining position information of the first sub-region;

receiving a second operation for the verification button;

matching the position information of the touch point with the position information of the first sub-region in response to the second operation; and passing the verification in a case that the position information of the touch point successfully matches the position information of the first sub-region.

In some implementations, the position information of the touch point successfully matches the position information of the first sub-region, which may indicate that the position of the touch point is the same as or at least partially overlap with the position of the first sub-region.

In some implementations, in the process of touching the tactile screen for verification by the user, the user first touches the entire verification region to sense a position and a shape of each first sub-region. Only after the user determines the position, the shape, and the like of each first sub-region, the first operation for verification is inputted for the first sub-region. In this way, in this implementation, the verification button is set, and after the user clicks the verification button, the position information of the touch point for verification inputted by the user is matched with the position information of the first sub-region.

This implementation can avoid the result of verification failure when the operation of the user erroneously triggers the matching between the touch point and the first sub-region, thereby reducing the quantity of repeated verification operations and reducing the operational convenience of the verification method.

In the verification method provided in the embodiments of the present disclosure, a first operation performed on the verification region of the electronic device is received; and in a case that the first operation does not meet a verification condition, adjusting a current value of a first sub-region in the verification region, or increasing an area of the first sub-region in the verification region, or adjusting a current value of a second sub-region in the verification region, where the verification region includes the first sub-region and the second sub-region, and after the current value of the first sub-region or the current value of the second sub-region is adjusted, the current value of the first sub-region is greater than the current value of the second sub-region. In this way, the first sub-region and the second sub-region have different current values, so that the first sub-region and the second sub-region have different tactile sensations. The user can accurately touch the first sub-region according to the tactile sensation to complete the verification, thereby ensuring that the verification operation is performed by a real person. In addition, before the user touches the first sub-region, the position of the first sub-region is not displayed, so that the user can determine the position of the first sub-region only after touching, which improves the security performance of the verification method.

Figure 3:
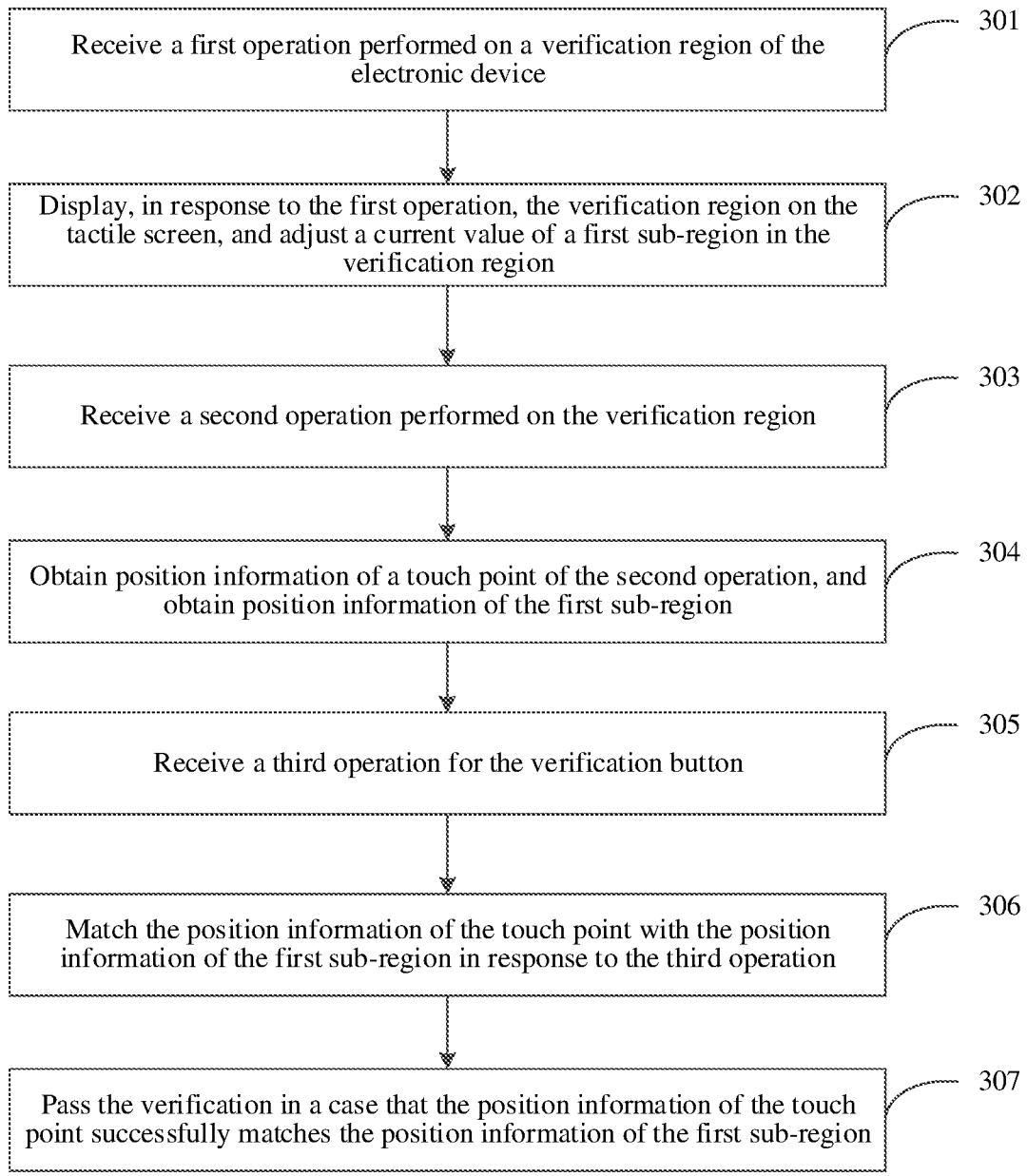
FIG. 3 is a flowchart of a second verification method according to an embodiment of the present disclosure.

FIG. 3 is a flowchart of a second verification method according to an embodiment of the present disclosure. The verification method is performed by an electronic device. The electronic device includes a tactile screen. As shown in FIG. 3, the verification method may include the following steps.

Step 301: receive a first operation performed on a verification region of the electronic device.

Step 302: display, in response to the first operation, the verification region on the tactile screen, and adjust a current value of a first sub-region in the verification region, where the verification region includes the first sub-region and a second sub-region, and the current value of the first sub-region is different from a current value of the second sub-region.

In this implementation, the displaying a verification region on the tactile screen and adjusting a current value of a first sub-region in the verification region may be to generate a first sub-region at a random position in the verification region, where the current value of the first sub-region is different from current values of other positions in the verification region.

Step 303: receive a second operation performed on the verification region.

In some implementations, the second operation may be a click operation, a hard-press operation, or the like inputted by the user in the verification region.

Optionally, before step 303, the current value of the first sub-region may be alternatively rapidly increased or decreased. For example, according to a cycle of 0.5 seconds, the current value of the first sub-region is controlled to periodically switch between a first current value and a second current value, where the first current value is different from the second current value.

In this way, the tactile intensity of the first sub-region can be increased, to improve the accuracy and the speed of sensing the first sub-region by the user, thereby improving the operation efficiency of the verification method.

Step 304: obtain position information of a touch point of the second operation, and obtain position information of the first sub-region.

Figure 4A:
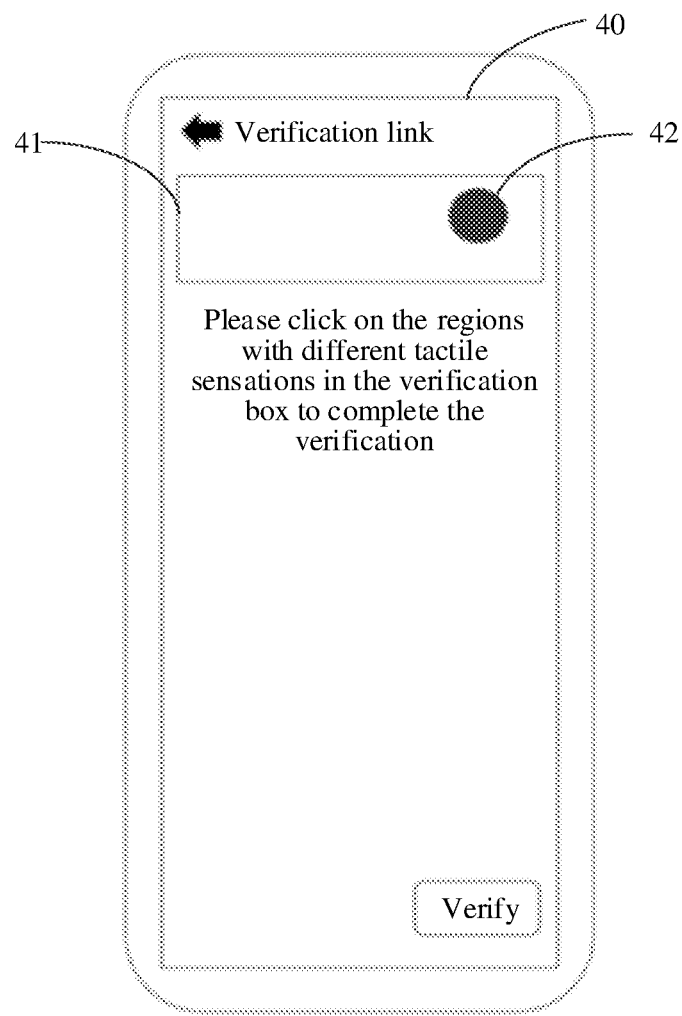
FIG. 4A is a first diagram of an application scenario of a second verification method according to an embodiment of the present disclosure.
Figure 4B:
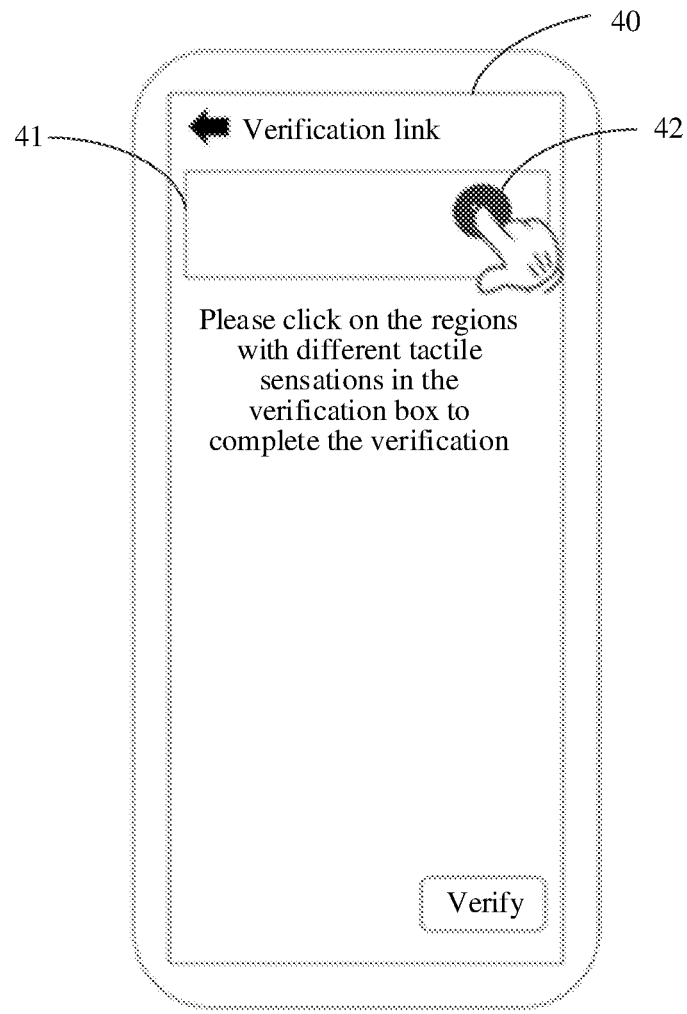
FIG. 4B is a second diagram of an application scenario of a second verification method according to an embodiment of the present disclosure.
Figure 4C:
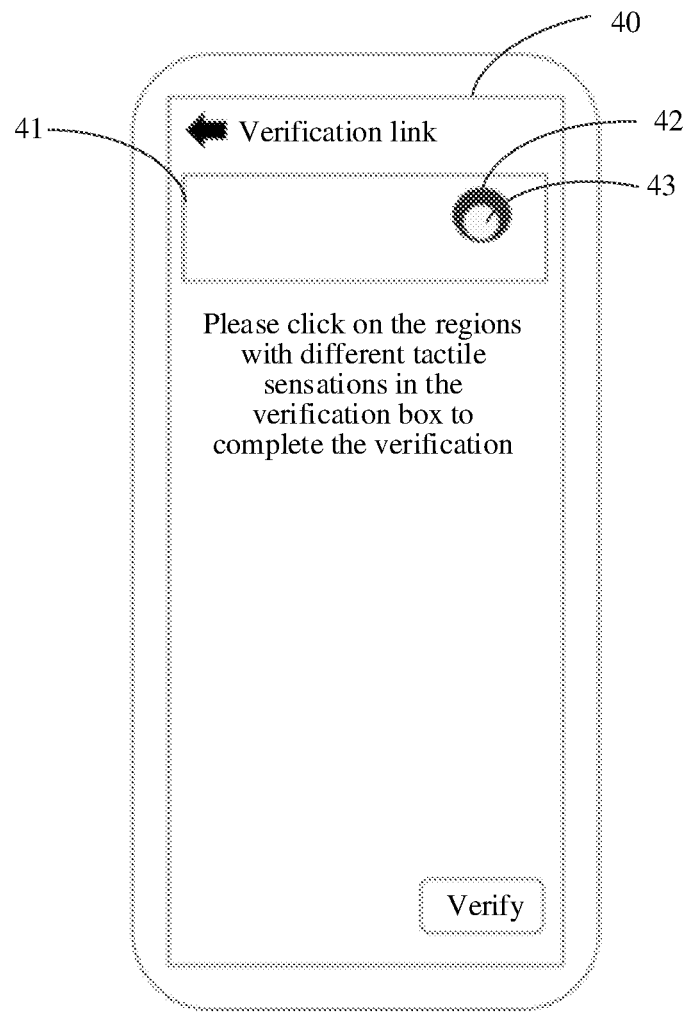
FIG. 4C is a third diagram of an application scenario of a second verification method according to an embodiment of the present disclosure.

In some implementations, when the second operation is successfully performed on the first sub-region, the first sub-region may be further displayed. For example, as shown in FIG. 4A to FIG. 4C, after the first operation is received, the mobile phone displays a verification interface 40 shown in FIG. 4A, where the verification interface 40 includes a verification region 41 and a first sub-region 42. After the user performs the second operation as shown in FIG. 4B on the first sub-region 42, a tactile point 43 as shown in FIG. 4C is displayed. The tactile point 43 overlaps with the first sub-region 42 to feedback to the user that the first sub-region 42 successfully receives the click operation. It should be noted that, the first sub-region 42 shown in FIG. 4A to FIG. 4C is only used for illustration, and in practical applications, the first sub-region is not displayed.

In this way, the user can check whether the input is correct according to the display statues of the first sub-region, so that the user can determine whether to perform verification according to the displayed first sub-region. When the user determines to perform verification according to the displayed first sub-region, the user performs a third operation for the verification button, so that the electronic device performs step 305.

In addition, the displaying the first sub-region may be to increase the brightness of the first sub-region, display the contour of the first sub-region, display the first sub-region in a color different from that of the verification region, or the like, which is not specifically limited herein.

It should be noted that, in the embodiment shown in FIG. 4A to FIG. 4C, there is only one first sub-region. In practical applications, there may be alternatively two or more first sub-regions, which is not specifically limited herein.

In an optional implementation, a clear button may be further displayed on the tactile screen, to clear the second operation inputted by the user in a case that a touch operation for the clear button is received.

In this way, in a case that the user inputs an erroneous second operation, the erroneous operation can be cleared, and the second operation can be re-inputted.

Certainly, in some implementations, the second operation may be alternatively cleared when the user touches the second sub-region, which is not specifically limited herein.

Step 305: receive a third operation for the verification button.

In some implementations, as shown in FIG. 4A to FIG. 4C, the verification button is located outside the verification region.

Step 306: match the position information of the touch point with the position information of the first sub-region in response to the third operation.

Step 307: pass the verification in a case that the position information of the touch point successfully matches the position information of the first sub-region.

In some implementations, if the verification fails, the process returns to step 301.

In the embodiments of the present disclosure, the verification button is set. In this way, after the user completes the second operation, the matching process between the touch point and the first sub-region is triggered according to the third operation of the user, so that in a case that the user does not complete or inputs a wrong second operation, the error can be corrected in time. Therefore, after the user inputs the correct second operation, the user can actively trigger the matching process between the touch point and the first sub-region, thereby improving the operational convenience of the verification method.

Figure 5:
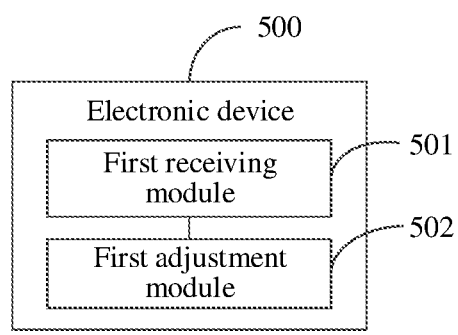
FIG. 5 is a first structural diagram of a first electronic device according to an embodiment of the present disclosure.

FIG. 5 is a structural diagram of an electronic device according to an embodiment of the present disclosure. The electronic device includes a tactile screen. As shown in FIG. 5, the electronic device 500 further includes:

a first receiving module 501, configured to receive a first operation performed on a verification region of the electronic device; and a first adjustment module 502, configured to, in a case that the first operation does not meet a verification condition, adjust a current value of a first sub-region in the verification region, or increase an area of the first sub-region in the verification region, or adjust a current value of a second sub-region in the verification region, where the verification region includes the first sub-region and the second sub-region, and after the current value of the first sub-region or the current value of the second sub-region is adjusted, the current value of the first sub-region is greater than the current value of the second sub-region.

Figure 6:
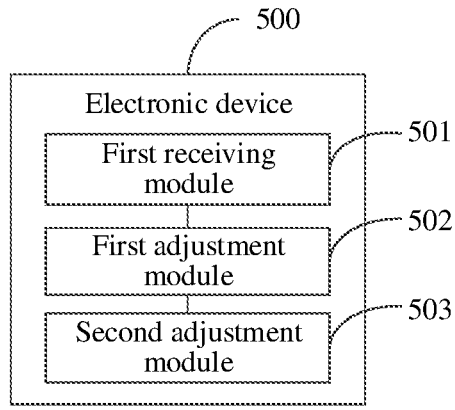
FIG. 6 is a second structural diagram of a first electronic device according to an embodiment of the present disclosure.

Optionally, as shown in FIG. 6, the electronic device 500 further includes:

a second adjustment module 503, configured to, after the in a case that the first operation does not meet a verification condition, adjusting a current value of a first sub-region in the verification region, or increasing an area of the first sub-region in the verification region, or adjusting a current value of a second sub-region in the verification region, in a case that a touch input for the second sub-region is received and a touch time of the touch input is longer than a preset time, adjust the current value of the first sub-region, or increase the area of the first sub-region, or adjust the current value of the second sub-region, where after the current value of the first sub-region or the current value of the second sub-region is adjusted, a difference between the current value of the first sub-region and the current value of the second sub-region increases.

Figure 7:
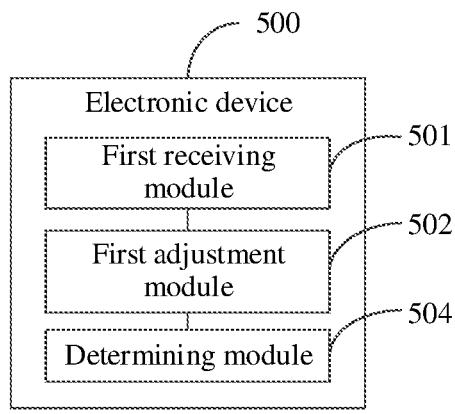
FIG. 7 is a third structural diagram of a first electronic device according to an embodiment of the present disclosure.

Optionally, as shown in FIG. 7, the electronic device 500 further includes:

a determining module 504, configured to determine, before the adjusting a current value of a first sub-region in the verification region, an output manner of a current of the first sub-region according to shape information of the first sub-region or position information of the first sub-region.

Optionally, the output manner includes a first manner or a second manner, the first manner is to output the current in a contour region of the first sub-region, and the second manner is to output the current in the first sub-region.

Figure 8:
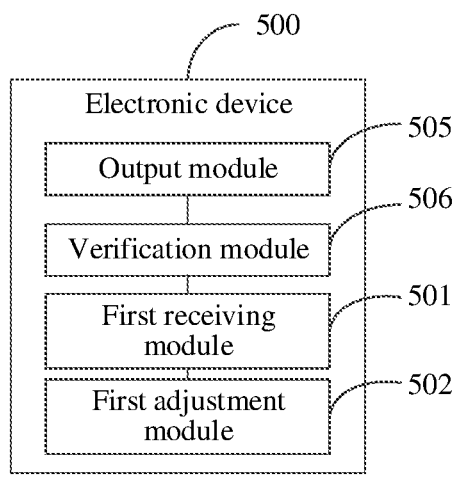
FIG. 8 is a fourth structural diagram of a first electronic device according to an embodiment of the present disclosure.

Optionally, in a case that there are at least two first sub-regions, as shown in FIG. 8, the electronic device 500 further includes:

an output module 505, configured to output, before the in a case that the first operation does not meet a verification condition, adjusting a current value of a first sub-region in the verification region, or increasing an area of the first sub-region in the verification region, or adjusting a current value of a second sub-region in the verification region, sequence prompt information of the at least two first sub-regions, where the sequence prompt information includes sequencing information of the at least two first sub-regions; and a verification module 506, configured to pass, after the in a case that the first operation does not meet a verification condition, adjusting a current value of a first sub-region in the verification region, or increasing an area of the first sub-region in the verification region, or adjusting a current value of a second sub-region in the verification region, the verification in a case that touch inputs matching a sequence indicated by the sequencing information is received in the at least two first sub-regions and no touch input is received in the second sub-region.

The electronic device provided in the embodiments of the present disclosure can implement the processes of the verification method provided in the method embodiments of the present disclosure, and can achieve the same beneficial effects. To avoid repetition, details are not described herein again.

Figure 9:
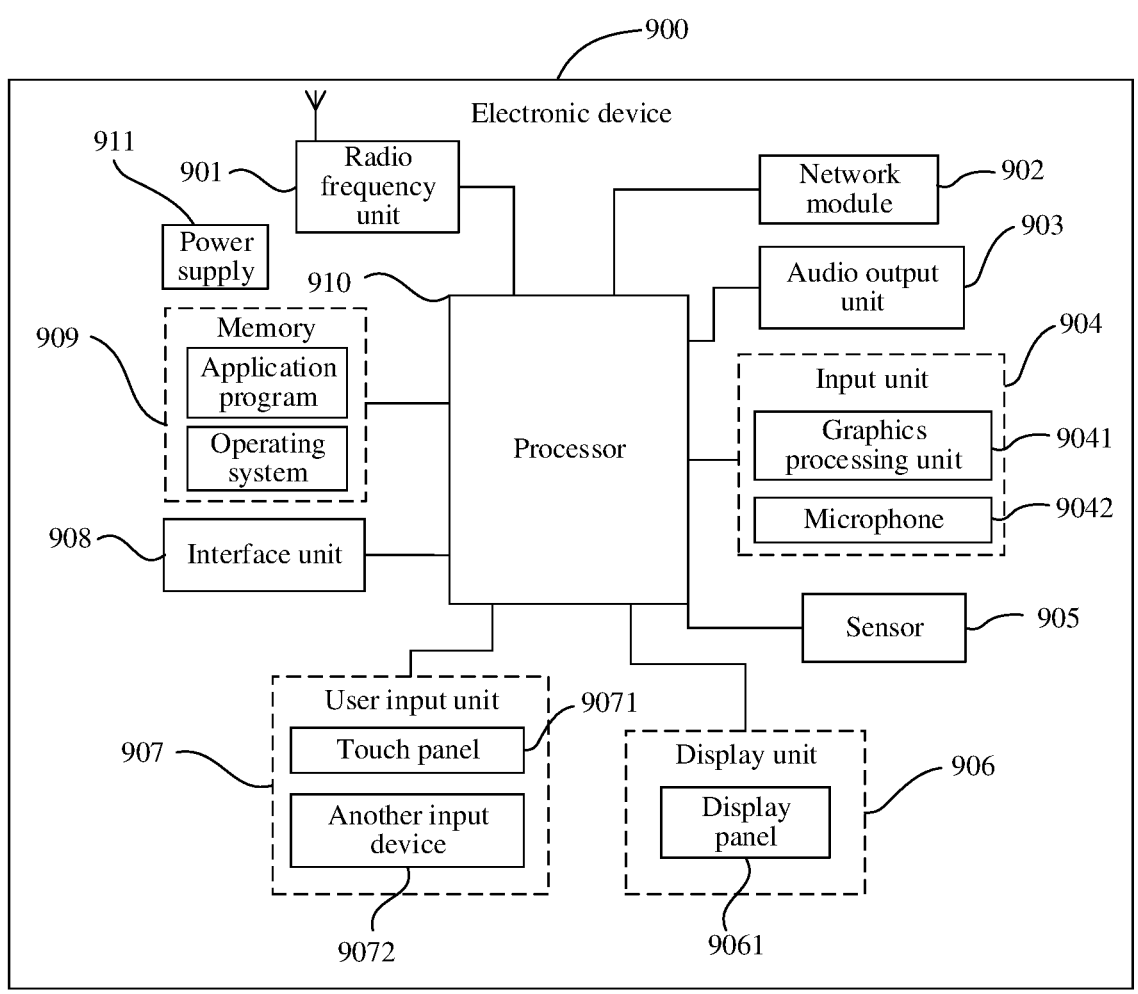
FIG. 9 is a structural diagram of a second electronic device according to an embodiment of the present disclosure.

Referring to FIG. 9, FIG. 9 is a schematic diagram of a hardware structure of an electronic device for implementing the embodiments of the present disclosure.

The electronic device 900 includes, but is not limited to, components such as a radio frequency unit 901, a network module 902, an audio output unit 903, an input unit 904, a sensor 905, a display unit 906, a user input unit 907, an interface unit 908, a memory 909, a processor 910, and a power supply 911. A person skilled in the art may understand that the electronic device structure shown in FIG. 9 does not constitute a limitation to the electronic device. The electronic device may include more or fewer components than those shown in the figure, or some components may be combined, or a different component deployment may be used. In the embodiments of the present disclosure, the electronic device includes, but is not limited to, a mobile phone, a tablet computer, a notebook computer, a handheld computer, an in-vehicle mobile terminal, a wearable device, a pedometer, a computer, and the like.

The user input unit 907 is configured to receive a first operation performed on a verification region of the electronic device.

The processor 910 is configured to, in a case that the first operation does not meet a verification condition, adjust a current value of a first sub-region in the verification region, or increase an area of the first sub-region in the verification region, or adjust a current value of a second sub-region in the verification region, where the verification region includes the first sub-region and the second sub-region, and after the current value of the first sub-region or the current value of the second sub-region is adjusted, the current value of the first sub-region is greater than the current value of the second sub-region.

Optionally, in a case that the first operation does not meet a verification condition, after performing the adjusting a current value of a first sub-region in the verification region, or the increasing an area of the first sub-region in the verification region, or the adjusting a current value of a second sub-region in the verification region, the processor 910 is further configured to:

in a case that a touch input for the second sub-region is received by the user input unit 907 and a touch time of the touch input is longer than a preset time, adjust the current value of the first sub-region, or increase the area of the first sub-region, or adjusting the current value of the second sub-region, where after the current value of the first sub-region or the current value of the second sub-region is adjusted, a difference between the current value of the first sub-region and the current value of the second sub-region increases.

Optionally, before performing the adjusting a current value of a first sub-region in the verification region, the processor 910 is further configured to:

determine an output manner of a current of the first sub-region according to shape information of the first sub-region or position information of the first sub-region.

Optionally, the output manner includes a first manner or a second manner, the first manner is to output the current in a contour region of the first sub-region, and the second manner is to output the current in the first sub-region.

Optionally, in a case that there are at least two first sub-regions, and before the processor 910 performs the in a case that the first operation does not meet a verification condition, adjusting a current value of a first sub-region in the verification region, or increasing an area of the first sub-region in the verification region, or adjusting a current value of a second sub-region in the verification region, the audio output unit 903 or the display unit 906 is configured to output sequence prompt information of the at least two first sub-regions, where the sequence prompt information includes sequencing information of the at least two first sub-regions; and the processor 910 is further configured to, after the in a case that the first operation does not meet a verification condition, adjusting a current value of a first sub-region in the verification region, or increasing an area of the first sub-region in the verification region, or adjusting a current value of a second sub-region in the verification region:

pass the verification in a case that touch inputs matching a sequence indicated by the sequencing information is received in the at least two first sub-regions and no touch input is received in the second sub-region.

In the electronic device 900 provided in this embodiment of the present disclosure, the current value of the first sub-region on the tactile screen may be different from the current value of the second sub-region, so that the user can sense the first sub-region through the tactile sensation, and perform the verification operation according to the position of the first sub-region, thereby performing verification using the tactile sensation of a real person. Therefore, the electronic device has the same beneficial effects as the verification method provided in the embodiments of the present disclosure, and details are not described herein again.

It should be understood that, in the embodiments of the present disclosure, the radio frequency unit 901 may be configured to receive and transmit information or receive and transmit a signal during a call. Optionally, after downlink data from a base station is received, the downlink data is sent to the processor 910 for processing. In addition, uplink data is sent to the base station. Generally, the radio frequency unit 901 includes, but is not limited to, an antenna, at least one amplifier, a transceiver, a coupler, a low noise amplifier, a duplexer, and the like. In addition, the radio frequency unit 901 may further communicate with another device through a wireless communications system and network.

The electronic device provides wireless broadband Internet access for a user by using the network module 902, for example, helps the user to send and receive an email, browse a web page, and access stream media, and the like.

The audio output unit 903 may convert audio data received by the radio frequency unit 901 or the network module 902 or stored in the memory 909 into audio signals and output the audio signals as sounds. In addition, the audio output unit 903 may further provide an audio output that is related to a particular function executed by the electronic device 900 (for example, a call signal receiving sound or a message receiving sound). The audio output unit 903 includes a speaker, a buzzer, a receiver, and the like.

The input unit 904 is configured to receive an audio or video signal. The input unit 904 may include a graphics processing unit (GPU) 9041 and a microphone 9042. The graphics processing unit 9041 performs processing on image data of a static picture or a video that is obtained by an image acquisition apparatus (for example, a camera) in a video acquisition mode or an image acquisition mode. The processed image frame can be displayed on the display unit 906. An image frame that has been processed by the graphics processing unit 9041 may be stored in the memory 909 (or another storage medium) or sent by using the radio frequency unit 901 or the network module 902. The microphone 9042 can receive sounds and can process such sounds as audio data. The processed audio data may be converted, in a phone call mode, into an output in a format that can sent by the radio frequency unit 901 to a mobile communication base station.

The electronic device 900 further includes at least one sensor 905, such as an optical sensor, a motion sensor, and other sensors. Optionally, the optical sensor includes an ambient light sensor and a proximity sensor. The ambient light sensor may adjust luminance of the display panel 9061 according to brightness of the ambient light. The proximity sensor may switch off the display panel 9061 and/or backlight when the electronic device 900 is moved to the ear. As one type of motion sensor, an acceleration sensor may detect magnitude of accelerations in various directions (generally in three axes), may detect magnitude and a direction of the gravity when static, and may be configured to identify an attitude of the electronic device (for example, switchover between horizontal and vertical screens, a related game, and attitude calibration of a magnetometer), a related function of vibration identification (for example, a pedometer and a knock); The sensor 905 may further include a fingerprint sensor, a pressure sensor, an iris sensor, a molecular sensor, a gyroscope, a barometer, a hygrometer, a thermometer, an infrared sensor, and the like, and details are not described herein again.

The display unit 906 is configured to display information inputted by the user or information provided for the user. The display unit 906 may include a display panel 9061. The display panel 9061 may be configured in the form of a liquid crystal display (LCD), an organic light-emitting diode (OLED), or the like.

The user input unit 907 may be configured to receive input digit or character information, and generate key signal input related to the user setting and function control of the electronic device. Optionally, the user input unit 907 includes a touch panel 9071 and another input device 9072. The touch panel 9071, also referred to as a touchscreen, may collect a touch operation of a user on or near the touch panel (for example, an operation of a user on or near the touch panel 9071 by using any suitable object or attachment, such as a finger or a stylus). The touch panel 9071 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 910. Moreover, the touch controller may receive and execute a command transmitted from the processor 910. In addition, the touch panel 9071 may be implemented by using various types, such as a resistive type, a capacitive type, an infrared type, and a surface acoustic wave type. In addition to the touch panel 9071, the user input unit 907 may further include another input device 9072. Optionally, the another input device 9072 may include, but is not limited to, a physical keyboard, a functional key (for example, a volume control key or a switch key), a track ball, a mouse, and a joystick, which are not repeated herein.

Optionally, the touch panel 9071 may cover the display panel 9061. After detecting a touch operation on or near the touch panel, the touch panel 9071 transfers the touch operation to the processor 910, to determine a type of a touch event. Then, the processor 910 provides a corresponding visual output on the display panel 9061 according to the type of the touch event. In FIG. 9, the touch panel 9071 and the display panel 9061 implement, as two independent parts, input and output functions of the electronic device. However, in some embodiments, the touch panel 9071 and the display panel 9061 may be integrated to implement the input and output functions of the electronic device, which is not specifically limited herein.

The interface unit 908 is an interface for connecting an external apparatus to the electronic device 900. For example, the external apparatus may include a wired or wireless headset port, an external power supply (or battery charger) port, a wired or wireless data port, a memory card port, a port for connecting an apparatus with a recognition module, an audio input/output (I/O) port, a video I/O port, a headphone port, and the like. The interface unit 908 may be configured to receive an input (for example, data information or electric power) from an external apparatus and transmit the received input to one or more elements in the electronic device 900 or may be configured to transmit data between the electronic device 900 and an external apparatus.

The memory 909 may be configured to store a software program and various data. The memory 909 may mainly include a program storage area and a data storage area. The program storage area may store an operating system, an application program required by at least one function (for example, a sound playback function and an image display function), and the like. The data storage area may store data (for example, audio data and a phone book) created according to use of the mobile phone. In addition, the memory 909 may include a high speed random access memory, and may further include a non-volatile memory, such as at least one magnetic disk storage device, a flash memory or other non-volatile solid state storage devices.

The processor 910 is a control center of the electronic device, and connects various parts of the entire electronic device by using various interfaces and lines. By running or executing the software program and/or module stored in the memory 909, and invoking data stored in the memory 909, the processor performs various functions of the electronic device and processes data, thereby performing overall monitoring on the electronic device. The processor 910 may include one or more processing units. Optionally, the processor 910 may integrate an application processor and a modem processor. The application processor mainly processes an operating system, a user interface, an application program, and the like. The modem processor mainly processes wireless communication. It may be understood that the foregoing modem processor may either not be integrated into the processor 910.

The electronic device 900 may further include the power supply 910 (such as a battery) for supplying power to the components. Optionally, the power supply 910 may be logically connected to the processor 910 by using a power management system, thereby implementing functions such as charging, discharging, and power consumption management by using the power management system.

In addition, the electronic device 900 includes some functional modules that are not shown, which are not described herein in detail.

Optionally, an embodiment of the present disclosure further provides an electronic device, including a processor 910, a memory 909, and a computer program stored in the memory 909 and executable on the processor 910, where the computer program, when executed by the processor 910, implements the processes of the embodiments of the verification method, and can achieve the same technical effects. To avoid repetition, details are not described herein again.

It should be noted that, the term "include", "comprise" or any other variation thereof herein is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses.

A person skilled in the art may clearly understand that, for simple and clear description, for work processes of the foregoing described system, apparatus, and unit, reference may be made to corresponding processes in the foregoing method embodiments, and details are not described herein again.

In the embodiments provided in this application, it is to be understood that the disclosed apparatus and method may be implemented in other manners. For example, the described apparatus embodiment is merely exemplary. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of the present disclosure may be integrated into one processing unit, or each of the units may be physically separated, or two or more units may be integrated into one unit.

Through the descriptions of the foregoing implementations, a person skilled in the art may clearly understand that the methods in the foregoing embodiments may be implemented via software and a necessary general hardware platform, and certainly, may also be implemented by hardware, but in many cases, the former manner is a better implementation. Based on such an understanding, the technical solutions of the present disclosure essentially, or the part contributing to the prior art, may be presented in the form of a software product. The computer software product is stored in a non-transitory storage medium (for example, a ROM/RAM, a magnetic disk, or an optical disc) including several instructions to enable an electronic device (which may be a mobile phone, a computer, a server, an air conditioner, a network device, or the like) to perform the methods described in the embodiments of the present disclosure.

A person skilled in the art may understand that all or some of the procedures of the methods of the foregoing embodiments may be implemented by a computer program controlling relevant hardware. The program may be stored in a non-transitory computer-readable storage medium. When the program is executed, the procedures of the foregoing method embodiments may be implemented. The non-transitory storage medium may be a magnetic disc, an optical disc, a read-only memory (ROM), a random access memory (RAM), or the like.

It may be understood that, the embodiments described in the embodiments of the present disclosure may be implemented by using software, hardware, firmware, middleware, microcode, or a combination thereof. For hardware implementation, a module, a unit, and a sub-unit may be implemented in one or more application-specific integrated circuits (ASIC), a digital signal processor (DSP), a digital signal processing device (DSPD), a programmable logic device (PLD), a field-programmable gate array (FPGA), a general purpose processor, a controller, a micro-controller, a microprocessor, and other electronic units configured to execute the functions described in the present disclosure, or a combination of the above.

For implementation by software, the technologies in the embodiments of the present disclosure may be implemented by performing the functional modules (for example, a process and a function) in the embodiments of the present disclosure. Software code may be stored in a memory and executed by a processor. The memory may be implemented in the processor or outside the processor.

The embodiments of the present disclosure are described above with reference to the accompanying drawings. However, the present disclosure is not limited to the foregoing specific implementations. The foregoing specific implementations are illustrative instead of limitative. Enlightened by the present disclosure, a person of ordinary skill in the art can make many forms without departing from the idea of the present disclosure and the scope of protection of the claims. All of the forms fall within the protection of the present disclosure.

What is claimed is:

1. A verification method, performed by an electronic device and comprising:
   receiving a first operation performed on a verification region;
   in a case that the first operation does not meet a verification condition, adjusting a current value of a first sub-region in the verification region, or increasing an area of the first sub-region in the verification region, or adjusting a current value of a second sub-region in the verification region, wherein
   the verification region comprises the first sub-region and the second sub-region, and after the current value of the first sub-region or the current value of the second sub-region is adjusted, the current value of the first sub-region is greater than the current value of the second sub-region; and
   in a case that a touch input for the second sub-region is received and a touch time of the touch input is longer than a preset time, adjusting the current value of the first sub-region, or increasing the area of the first sub-region, or adjusting the current value of the second sub-region, wherein
   after the current value of the first sub-region or the current value of the second sub-region is adjusted, a difference between the current value of the first sub-region and the current value of the second sub-region increases.

2. The method according to claim 1, wherein in a case of adjusting the current value of the first sub-region in the verification region, before the adjusting the current value of the first sub-region in the verification region, the method further comprises:
   determining an output manner of a current of the first sub-region according to shape information of the first sub-region or position information of the first sub-region.

3. The method according to claim 2, wherein the output manner comprises a first manner or a second manner, the first manner is to output the current in a contour region of the first sub-region, and the second manner is to output the current in the first sub-region.

4. A computer program product comprising at least one non-transitory computer-readable medium including one or more program instructions, that when executed by at least one processor, cause the at least one processor to perform the steps of the verification method according to claim 3.

5. A computer program product comprising at least one non-transitory computer-readable medium including one or more program instructions, that when executed by at least one processor, cause the at least one processor to perform the steps of the verification method according to claim 2.

6. The method according to claim 1, wherein in a case that there are at least two first sub-regions, and before the case that the first operation does not meet the verification condition, adjusting the current value of the first sub-region in the verification region, or increasing the area of the first sub-region in the verification region, or adjusting the current value of the second sub-region in the verification region, the method further comprises:
   outputting sequence prompt information of the at least two first sub-regions, wherein the sequence prompt information comprises sequencing information of the at least two first sub-regions; and
   after the case that the first operation does not meet the verification condition, adjusting the current value of the first sub-region in the verification region, or increasing the area of the first sub-region in the verification region, or adjusting the current value of the second sub-region in the verification region, the method further comprises:
   passing the verification condition in a case that touch inputs matching a sequence indicated by the sequencing information is received in the at least two first sub-regions and no touch input is received in the second sub-region.

7. A computer program product comprising: at least one processor and a non-transitory storage medium that stores program instructions, wherein the at least one processor is configured to execute the program instructions to perform the steps of the verification method according to claim 2.

8. A computer program product comprising: at least one processor and a non-transitory storage medium that stores program instructions, wherein the at least one processor is configured to execute the program instructions to perform steps of the verification method according to claim 1.

9. An electronic device, comprising a memory, a processor, and a computer program stored in the memory and executable on the processor, wherein the computer program, when executed by the processor, causes the electronic device to perform:
receiving a first operation performed on a verification region;
in a case that the first operation does not meet a verification condition, adjusting a current value of a first sub-region in the verification region, or increasing an area of the first sub-region in the verification region, or adjusting a current value of a second sub-region in the verification region, wherein
the verification region comprises the first sub-region and the second sub-region, and after the current value of the first sub-region or the current value of the second sub-region is adjusted, the current value of the first sub-region is greater than the current value of the second sub-region; and
in a case that a touch input for the second sub-region is received and a touch time of the touch input is longer than a preset time, adjusting the current value of the first sub-region, or increasing the area of the first sub-region, or adjusting the current value of the second sub-region, wherein
after the current value of the first sub-region or the current value of the second sub-region is adjusted, a difference between the current value of the first sub-region and the current value of the second sub-region increases.

10. The electronic device according to claim 9, wherein the computer program, when executed by the processor, causes the electronic device to further perform:
determining an output manner of a current of the first sub-region according to shape information of the first sub-region or position information of the first sub-region.

11. The electronic device according to claim 10, wherein the output manner comprises a first manner or a second manner, the first manner is to output the current in a contour region of the first sub-region, and the second manner is to output the current in the first sub-region.

12. The electronic device according to claim 9, wherein in a case that there are at least two first sub-regions, and the computer program, when executed by the processor, causes the electronic device to further perform:
outputting sequence prompt information of the at least two first sub-regions, wherein the sequence prompt information comprises sequencing information of the at least two first sub-regions; and
the computer program, when executed by the processor, causes the electronic device to further perform:
passing the verification condition in a case that touch inputs matching a sequence indicated by the sequencing information is received in the at least two first sub-regions and no touch input is received in the second sub-region.

13. A non-transitory computer-readable storage medium, storing a computer program, wherein the computer program, when executed by a processor of an electronic device, causes the electronic device to perform:
receiving a first operation performed on a verification region;
in a case that the first operation does not meet a verification condition, adjusting a current value of a first sub-region in the verification region, or increasing an area of the first sub-region in the verification region, or adjusting a current value of a second sub-region in the verification region, wherein
the verification region comprises the first sub-region and the second sub-region, and after the current value of the first sub-region or the current value of the second sub-region is adjusted, the current value of the first sub-region is greater than the current value of the second sub-region; and
in a case that a touch input for the second sub-region is received and a touch time of the touch input is longer than a preset time, adjusting the current value of the first sub-region, or increasing the area of the first sub-region, or adjusting the current value of the second sub-region, wherein
after the current value of the first sub-region or the current value of the second sub-region is adjusted, a difference between the current value of the first sub-region and the current value of the second sub-region increases.

14. The non-transitory computer-readable storage medium according to claim 13, wherein the computer program, when executed by the processor, causes the electronic device to further perform:
determining an output manner of a current of the first sub-region according to shape information of the first sub-region or position information of the first sub-region.

15. The non-transitory computer-readable storage medium according to claim 14, wherein the output manner comprises a first manner or a second manner, the first manner is to output the current in a contour region of the first sub-region, and the second manner is to output the current in the first sub-region.

16. The non-transitory computer-readable storage medium according to claim 13, wherein in a case that there are at least two first sub-regions, and the computer program, when executed by the processor, causes the electronic device to further perform:
outputting sequence prompt information of the at least two first sub-regions, wherein the sequence prompt information comprises sequencing information of the at least two first sub-regions; and
the computer program, when executed by the processor, causes the electronic device to further perform:
passing the verification condition in a case that touch inputs matching a sequence indicated by the sequencing information is received in the at least two first sub-regions and no touch input is received in the second sub-region.

* * * * *